United States Patent
Rodriguez Bravo et al.

(10) Patent No.: US 12,493,704 B2
(45) Date of Patent: Dec. 9, 2025

(54) PROTECTING A NON-VOLATILE SOLID-STATE MEMORY FROM AN UNAUTHORIZED ACCESS

(71) Applicant: Kyndryl, Inc., New York, NY (US)

(72) Inventors: Cesar Augusto Rodriguez Bravo, Alajuela (CR); David Alonso Campos Batista, Aurora (CR); Thomas Brackhahn, Garches (FR)

(73) Assignee: Kyndryl, Inc., New York, NY (US)

( * ) Notice: Subject to any disclaimer, the term of this patent is extended or adjusted under 35 U.S.C. 154(b) by 85 days.

(21) Appl. No.: 18/436,899

(22) Filed: Feb. 8, 2024

(65) Prior Publication Data
US 2025/0053671 A1    Feb. 13, 2025

(30) Foreign Application Priority Data
Aug. 10, 2023 (EP) ..................... 23315309

(51) Int. Cl.
*G06F 21/62* (2013.01)
*G06F 21/79* (2013.01)

(52) U.S. Cl.
CPC .............. *G06F 21/62* (2013.01); *G06F 21/79* (2013.01); *G06F 2221/2143* (2013.01)

(58) Field of Classification Search
CPC ... G06F 21/62; G06F 21/79; G06F 2221/2143
See application file for complete search history.

(56) References Cited

U.S. PATENT DOCUMENTS

| 10,665,290 | B1* | 5/2020 | He | G11C 11/40611 |
| 2006/0117393 | A1* | 6/2006 | Merry | G06F 21/79 |
| | | | | 711/E12.1 |
| 2012/0151121 | A1 | 6/2012 | Braga | |
| 2012/0278529 | A1 | 11/2012 | Hars | |
| 2016/0133331 | A1 | 5/2016 | Hoeffgen | |
| 2021/0103527 | A1* | 4/2021 | Morrison | G11C 7/24 |
| 2022/0075523 | A1 | 3/2022 | Muthukumaran | |
| 2022/0342581 | A1 | 10/2022 | Cariello | |
| 2024/0232410 | A1* | 7/2024 | Bennett | G06F 21/6218 |

FOREIGN PATENT DOCUMENTS

| CN | 101706853 B | 5/2011 |
| CN | 101465164 B | 4/2013 |
| CN | 104461945 A | 3/2015 |

OTHER PUBLICATIONS

"Could Your Printer be a Security Risk Because It Saves a Copy of Your Data?" Hackworth, Aug. 20, 2013, 9 pages.
"USBKill V4," USBKill, 2023, 15 pages.

\* cited by examiner

*Primary Examiner* — Mohammad W Reza
(74) *Attorney, Agent, or Firm* — CANTOR COLBURN LLP; Erik Swanson

(57) ABSTRACT

An approach is provided for protecting data stored by a non-volatile solid-state memory from an unauthorized access. In response to a trigger event indicating an increased probability of the unauthorized access, the memory is destroyed by directing through the memory an electric current exceeding a rated current of the memory, and testing an operability of the memory, where the destruction is completed when the test indicates lacking operability of the memory.

19 Claims, 3 Drawing Sheets

PROTECTING A NON-VOLATILE SOLID-STATE MEMORY FROM AN UNAUTHORIZED ACCESS

BACKGROUND

The present invention relates to a destructive method of protecting data stored by a non-volatile solid-state memory from an unauthorized access, and corresponding devices and computer program products.

In many jurisdictions, it is illegal to dispose of electronic devices as normal waste. Therefore, companies and government agencies pay external service providers to dispose of unused or discontinued electronic devices. However, there is a security risk associated with the embedded memory of network devices. In fact, many devices have some internal storage that attackers can leverage to gather sensitive information. Network printers are an example, they usually have at least 1 gigabyte (GB) of internal (e.g., embedded/SMD) non-volatile memory that is used to cache documents in a network printer pool, for instance. This means that an attacker may be able to retrieve thousands of documents that have been sent to that printer by stealing the memory.

Known approaches of destructive data protection include methods of destroying semantic coherence of data by reprogramming memory cells in an obfuscating manner. Techniques including potential hardware destruction are applied in the field of testing computing devices for protection from power surges and electrostatic discharge, where software and devices are known that provide potentially damaging electric currents to mainboard components, causing irreversible malfunction of the computing device if it is insufficiently protected.

SUMMARY

In one aspect, the invention relates to a computer-implemented method of protecting data stored by a non-volatile solid-state memory from an unauthorized access, the method including, in response to a trigger event indicating an increased probability of the unauthorized access, destroying the memory by directing through the memory an electric current exceeding a rated current of the memory, and testing an operability of the memory, where the destruction is completed when the test indicates lacking operability of the memory.

In a further aspect, the invention relates to a memory controller, configured for controlling a non-volatile solid-state memory, the controlling including performing a method of protecting data stored by the memory from an unauthorized access, the method including, in response to a trigger event indicating an increased probability of the unauthorized access, destroying the memory by directing through the memory an electric current exceeding a rated current of the memory, and testing an operability of the memory, where the destruction is completed when the test indicates lacking operability of the memory.

In a further aspect, the invention relates to a memory device including a non-volatile solid-state memory and the memory controller configured for controlling the non-volatile solid-state memory of the memory device.

In a further aspect, the invention relates to a computing device including a processor and the memory device functionally coupled to the processor.

In a further aspect, the invention relates to a mobile trigger device, configured for enabling initiation of the trigger event when the mobile trigger device is functionally coupled to the computing device.

In a further aspect, the invention relates to a computer program product including a computer readable storage medium having program instructions embodied therewith, the program instructions being executable by a processor functionally coupled to a non-volatile solid-state memory to cause the processor to perform a method of protecting data stored by the memory from an unauthorized access, the method including, in response to a trigger event indicating an increased probability of the unauthorized access, destroying the memory by directing through the memory an electric current exceeding a rated current of the memory, and testing an operability of the memory, where the destruction is completed when the test indicates lacking operability of the memory.

In a further aspect, the invention relates to a computer program product including a computer readable storage medium having program instructions embodied therewith, the program instructions being executable by a second computing device communicatively connected to a first computing device incorporating the memory device, where execution of the program instructions by the second computing device causes the second computing device to enable initiating the trigger event on the first computing device.

In a further aspect, the invention relates to a system for detecting an unauthorized mechanical manipulation of a computing device including a non-volatile solid-state memory, the system being configured for initiating a trigger event if the unauthorized mechanical manipulation is detected, the trigger event causing the computing device to perform a method including destroying the memory by directing through the memory an electric current exceeding a rated current of the memory, and testing an operability of the memory, where the destruction is completed when the test indicates lacking operability of the memory.

Embodiments of the invention are given in the dependent claims. Embodiments of the present invention can be freely combined with each other if they are not mutually exclusive.

BRIEF DESCRIPTION OF THE DRAWINGS

In the following, embodiments of the invention are explained in greater detail, by way of example only, making reference to the drawings in which.

DETAILED DESCRIPTION

Figure 1:
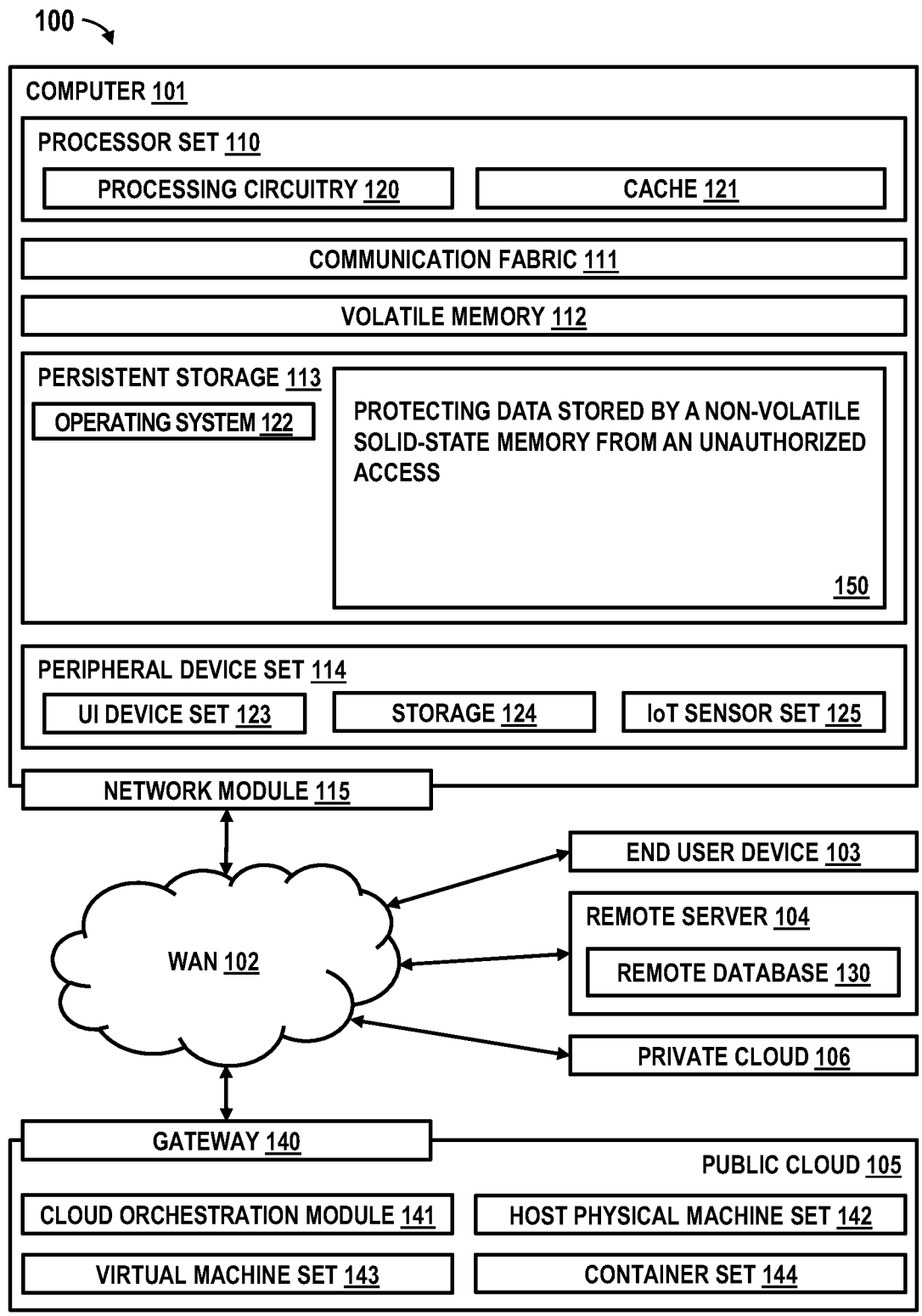
FIG. 1 is a block diagram depicting a computing environment capable of performing the method disclosed herein.

Many computing devices, including internet-of-things (IoT) devices such as network printers, contain internal memory devices that are removable or detachable from a circuit board by hand. At least some memory onboard such computing devices may be solid-state memory integrated in a chip package, and may be non-volatile and programmable, such as solid-state drive (SSD) memory and flash memory. Data stored on non-volatile memory may thus be accessed by removing the memory device incorporating the memory from the computer device incorporating the memory device. Getting hold of detachable memory devices may be especially easy during disposal of decommissioned computing devices. As it is regularly possible that non-volatile memory stores data of confidential, private, personal, or otherwise sensitive nature, it is desirable to restrict unauthorized access to such data.

The method disclosed herein is directed to protecting data stored by a non-volatile solid-state memory (implemented, e.g., as one or more packaged chips) from unauthorized access. Said method may be carried out by a correspondingly configured (hardcoded or programmed) processor that is in a functional coupling with the memory, including but not limited to a memory controller of a memory device incorporating the memory, a general-purpose or specialized processor of a computing device incorporating the memory device (e.g., a central processing unit (CPU), a northbridge, a graphics processing unit (GPU)), a processor of a mobile device that can be connected to, and detached from, an interface of the computing device, or a processor of another computing device connected to the computing device incorporating the memory via a communications link, including a private network or a public network such as the internet.

A computing device incorporating the memory device is also referred to herein as a first computing device, as opposed to a second computing device from which the first computing device may receive a signal incorporating the trigger event. A second computing device purpose-built for providing the possibility of initiating the trigger event (e.g., by manual operation of a physical trigger button or a software-implemented trigger function) is also referred to herein as a trigger device. Not necessarily, second computing devices and trigger devices may be mobile devices connectable to an interface of the first computing device using, e.g., a wireless, wired, or plug connection.

A memory device carrying or incorporating the memory (e.g., a circuit board to which the memory is soldered) does not necessarily have to be detachable from components of the computing device incorporating the memory. The method may be started by a trigger event such as a receipt of a specific signal, including a specific command, or an establishment or loss of a particular electrical and/or mechanical connection, etc. The trigger event may be predefined to be indicative of an increased risk of an unauthorized access to the memory. The possibility of unauthorized access signaled by the trigger event may include a possible mechanical, in particular manual access to a memory device incorporating the memory. Exemplary trigger events include a signal indicating opening of a housing of the first computing device in a manner not specified as secure; occurrence of an electrostatic discharge on a component of the first computing device (e.g., a circuit board) having characteristics of electrical contact with a human body, absence of a signal indicating electrical contact of the memory device to a circuit board (e.g., a mainboard) of the first computing device, and receipt of a signal, including a command, from the first or second computing device, including a signal generated by software being executed on the first or second computing device, requiring destruction of the memory.

In response to the signal, command, or other change incorporating the trigger event a destruction of the memory may be performed. The memory may be destroyed physically, rendering inoperable any functions of the memory such as reading, writing, and/or responding to specific commands and signals in a predefined manner, and/or canceling the memory's capability to store information at all. For this purpose, an electric current may be generated or switched so as to flow through the memory storing the data to be protected. Directing a particular current through the memory may include applying a particular corresponding voltage to the memory causing the intended flow of electric current through the memory.

The electric current thus directed through the memory may exceed a rated current of the memory that has been identified as a maximum current that may be supplied to the memory via the memory's electric power supply terminals where a continuous operation of the memory is warranted without damaging the memory. Exceeding the rated current of the memory may thus cause current densities inside the solid-state memory that may irreversibly change the microscopic structure of crystal or other solid-state structures or components of the die or dice implementing the memory. Directing an electric current exceeding a rated current of the memory may include directing a higher-than-usual current through electric terminals of the memory that are not specified as power supply terminals, in particular terminals such as voltage supply terminals that are not designed as susceptible to significant electric currents at all. This may decrease the minimum current intensity needed to destroy the memory.

The method may also comprise testing whether the memory is operable. This may be done, for instance, by observing whether the memory is responding to a signal or command. The memory may be considered inoperable if it does not respond to a specified signal in a specified manner of responding to such signal. Such inoperable behavior may include the memory not responding at all. If the test shows that the memory is inoperable, the destruction of the memory may be considered completed, which may be a criterion for ending the method.

The method may also include steps of saving the memory from inadvertent destruction that may occur during an authorized access to the memory or the first computing device. For instance, the method may further comprise preventing the destruction of the memory if credentials (e.g., a cryptographic key or password, a name of an authorized person, etc.) indicating the authorized access are received. In this example, the destruction of the memory may be prevented for a time period (e.g., an expected duration of computer maintenance) that may be predefined or indicated alongside the credentials, or until a signal or command indicating an end of the time period is received.

Relying on the trigger signal indicating an actual risk of unauthorized access to the memory, the destruction of the memory may have the advantage of providing an ultimate access protection to the data stored by the memory, as the physical structures (e.g., memory cells) storing the data may be permanently and irreversibly destroyed or rendered inaccessible. By virtue of testing the operability of the memory, performing the destruction dependent on the memory's determined operability may ensure that the destruction is effective and may thus lower the rate of unsuccessfully destroyed memories when considering a plurality of first computing devices.

In an example, the destruction comprises repetitions of directing the electric current through the memory. Repeatedly directing through the memory an electric current exceeding a rated current of the memory may increase the amount of damage to the memory, and may thus decrease the probability of being able to recover any portions of the data. During the repetitions, the process of directing may be varied, e.g., by altering the terminals through which the current is directed, and/or varying the current intensity of the current. This may yield a higher flexibility for choosing an appropriate way of destructing the memory.

In an example, the current is successively increased during the repetitions. This may further increase the probability of a successful destruction; may further increase the amount of damage to the memory; and/or may provide the possibility of destroying the memory with a smaller amount of electric energy than applying with a high current already, e.g., in the first repetition. In particular, the current may be successively increased during each of the repetitions, i.e., for each given repetition that is not the first repetition, the current may be greater than the current directed through the memory during the repetition immediately preceding the given repetition. The specification of a current being "greater than" another current may, e.g., refer to a constant current level at a higher current intensity than the other current, or to a current intensity being a non-constant function of time that, during the given non-first repetition, assumes a maximum that is greater than a maximum the current intensity reached during a repetition preceding the given repetition.

In an example, for the repetitions, the current is selected from a predefined set of currents exceeding standard values of the rated current. This may take into account that many memory devices have specified equal rated currents, such that the large number of memory device models on the market may be represented by a small number of rated currents to be exceeded during the repetitions. For instance, if there are ten possible standard values of rated currents representing most memory devices, the method may attempt up to ten repetitions of destroying a given memory using a set of ten currents, each exceeding a corresponding one of the ten standard rated currents. In a more specific example, each exceeding current may exceed its corresponding standard rated current by a predefined (e.g., fixed) percentage, e.g., 10 or 20 percent.

In an example, the current is generated by discharging a capacitor of a memory device incorporating the memory. This may make the destruction of the memory more independent from power sources external to the memory device. It may be possible to destroy the memory solely using the discharge current of the capacitor, which may be possible even if the memory device is detached from the first computing device. For instance, a memory device may comprise a capacitor that is connected in parallel or in series to power supply terminals or other terminals of the memory and has a sufficient capacity for discharging a current of the desired current intensity through the memory. In order to direct the current through the memory, it may be necessary to switch electrical connections of the memory device in a suitable manner to form a closed circuit enabling the capacitor to direct the discharge current through the memory.

In an example, the generation of the current further comprises charging the capacitor at a voltage (referred to as overcharging voltage) exceeding a rated charging voltage of the capacitor. This may enable overcharging the capacitor, thus forcing the capacitor to collect more charge carriers than could be collected by charging the capacitor at the rated charging voltage. By discharging the overcharged capacitor through the memory, a higher current density may be achieved inside the memory, which may enable a successful destruction of the memory with a smaller number of destruction attempts and/or may increase the amount of damage to the memory, which may decrease the probability of being able to recover any portions of the data. It may be worthwhile to select the overcharging voltage not too large so as to protect the capacitor from damage (e.g., breakdown or explosion), which may prevent a successful destruction of the memory. In an experiment, a capacitor of a typical memory device having a Serial ATA (SATA) connector was charged at 900 milliampere (mA) within 83 milliseconds (ms) using a SATA 5-volt (5V) bus.

In an example, the memory is a component of a memory device functionally coupled to a (first) computing device electrically connected to a power source, the method further comprising establishing an electrical connection from the memory device to the power source for generating the current. This may enable directing the current through the memory with a higher current intensity than would be possible using, e.g., the limited capacity of a capacitor for generating the current, which may enable a successful destruction of the memory with a smaller number of destruction attempts and/or may increase the amount of damage to the memory, which may decrease the probability of being able to recover any portions of the data. Generating the current for destroying the memory using the power source may be done, e.g., by increasing a voltage or current supplied by the power source and applied to a pair of terminals of the memory, or by switching electrical connections from such terminals to terminals of the power source capable of delivering a higher voltage or current. If possible, necessary changes of electrical connections may be controlled by the memory device itself (e.g., by a memory controller of the memory device controlling the memory), or the memory device may cause the first computing device to provide the necessary connection to the power source. In a more specific example, circuitry and connectors of the memory device electrically connects the memory to suitable terminals of a SATA port of the first computing device that is powered by a power supply unit of the first computing device.

In an example, the electrical connection between the power source and the computing device is provided by a communications network, in particular by a power-over-ethernet connection. This may enable providing a suitable current for the destruction of the memory even if the first computing device is switched off or disconnected from mains, as power supply via a network connection may be independent of the mains supply of the first computing device. If possible, necessary changes of electrical connections for establishing an electrical connection from the memory to the communications network may be controlled by the memory device itself (e.g., by a memory controller of the memory device controlling the memory), or the memory device may cause the first computing device or a suitable component thereof (e.g., a network adapter) to provide the necessary connection to the network.

In an example, the trigger event is selected from the group consisting of a receipt of a signal indicating an attempt of unauthorized mechanical manipulation of a first computing device incorporating the memory; a receipt of an instruction requiring destruction of the memory; a power-up of the memory device outside a predefined geographic area; a mechanical detachment of the memory from the first computing device; and an establishment of a functional coupling of the memory to a second computing device different from the first computing device.

The signal indicating an attempt of unauthorized mechanical manipulation may provide an additional protection for the data stored by the memory in cases where tampering of the first computing device can be detected but not avoided. In an example, the (first) computing device is configured for initiating the trigger event if an attempt of unauthorized mechanical manipulation of the (first) computing device is detected. For instance, the first computing device may be equipped with an intrusion detection system or a similar technique that may detect an attempt of mechanical manipulation of the first computing device. Preferably, the first computing device is configured to generate the signal indicating an attempt of unauthorized mechanical manipulation not before detecting that an unauthorized mechanical manipulation of the memory cannot be avoided, as may be the case when an intrusion attempt to the first computing system is successful. This may protect the memory from unjustified destruction in cases of unsuccessful attempts of unauthorized manipulation.

Triggering the destruction in response to a receipt of an instruction requiring destruction of the memory may enable a more flexible control of the destruction. For instance and without limitation, issuance of such instruction may be triggered by a user of the first computing device preparing the first computing device for decommissioning; by a user managing the first computing device using a second computing device; and/or by a defense software detecting a hacking attempt on the first computing device.

Triggering the destruction in response to a power-up of the memory device outside a predefined geographic area may provide additional access protection to the data in cases where the memory is transported away from the predefined geographic area. For this purpose, the memory device may have a power-up routine comprising retrieving coordinates of a geographic position of a computing device currently deploying the memory, and determining whether the current position lies within the predefined geographic area. The memory's current position being not inside the predefined geographic area may be considered an unauthorized operation of the memory justifying destruction of the memory. This may be beneficial for use cases where the memory is supposed to be permanently operated at a certain place. For instance, the predefined geographic area may be defined by a set of coordinates characterizing boundaries of company premises where the memory is supposed to be operated safely.

The destruction of the memory may also be triggered upon a mechanical detachment of the memory device from the first computing device. This may provide for an early destruction of the memory, which may reduce the time window for potential recovery attempts and may thus increase the access protection for the data. Computing devices may be equipped with removable devices for practical reasons, e.g., facilitating manufacturing of the computing device, but despite of installing removable memory devices, the memory may not supposed to be removed from the first computing device after manufacturing. In this case, a detachment of the memory from the first computing device may be a clear indication of an attempt to gain unauthorized access to the data stored by the memory. Detachment of the memory from the first computing device may be recognized, e.g., by detecting absence of a signal verifying a mechanical connection to a computing device, such as a battery-supplied voltage applied to a terminal of the memory.

Triggering the destruction in response to an establishment of a functional coupling of the memory to a second computing device different from the first computing device may enable using a current supplied by a power source of the second computing device as the current for destroying the memory. In this way, a sufficient supply of electric energy for a successful destruction of the memory may be ensured. Preferably, the destruction may be triggered as early as possible (e.g., during power-up of the memory device) in response to a detection of such functional coupling to a different device than the first computing device. The establishment of such functional coupling may be detected by, e.g., obtaining a unique identifier of the second computing device (e.g., a device identification, an MAC address, a cryptographic key, etc.) and comparing the obtained identifier to a unique identifier of the first computing device stored by the memory device.

In an example, the destruction is limited to the memory. This may enable an effective access protection for the data stored by the memory without deteriorating or losing functions provided by valuable components of the first computing device apart from the memory device. Limiting the destruction to the memory may be achieved by ensuring (e.g., by suitable switching operations, by using characteristics of circuitry of the first computing device, and/or by generating the current inside the memory device) that the current destroying the memory is not directed through any other components of the first computing device that may get damaged by the current as well.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as the method of protecting data stored by a non-volatile solid-state memory from an unauthorized access 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers.

IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
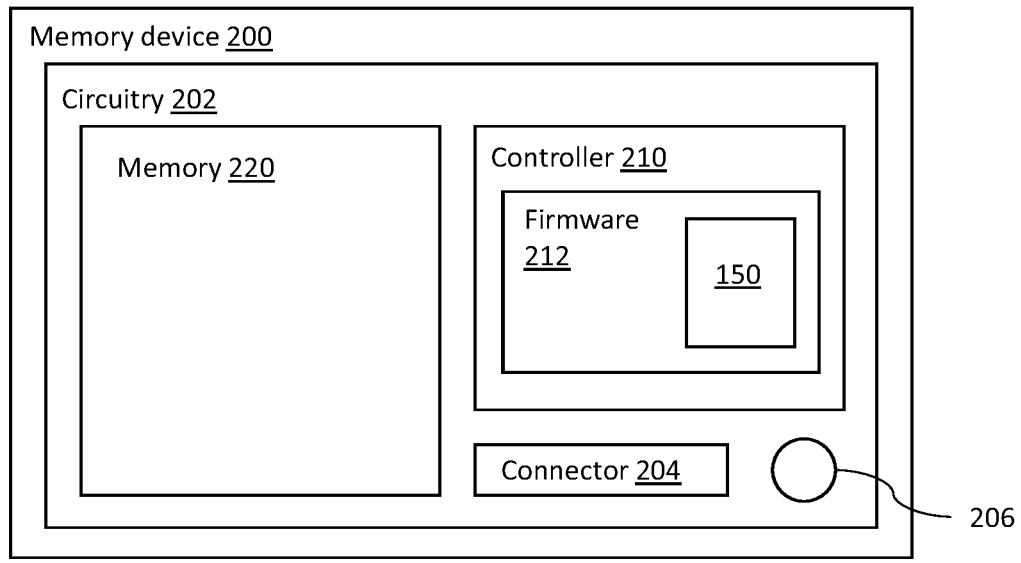
FIG. 2 is a block diagram depicting a memory device incorporating non-volatile solid-state memory.

FIG. 2 is a schematic block diagram depicting an exemplary memory device 200 incorporating non-volatile solid-state memory 220 (e.g., one or more memory chips providing the memory 220). The memory device 200 further comprises a memory controller 210 configured for operating the memory 220 and controlling at least some electrical connections of the memory 220; a connector 204 providing an interface for electrical signaling and power supply connections to another device (e.g., a computing device); a capacitor 206; and electric circuitry 202 providing electrical connections between the components of the memory device 200. Preferably, the circuitry 202 is structured such that the capacitor 206 electrically interfaces the connector 204 and the controller 210, and that the controller 210 electrically interfaces the capacitor 206 and the memory 220.

The controller 210 may comprise firmware 212 and/or may be hardcoded to perform functions of operating the memory 220. In the example shown, the firmware 212 comprises instructions 150 implementing the method of protecting data stored by a non-volatile solid-state memory from an unauthorized access disclosed herein. It is understood, however, that some or all of the instructions 150 may likewise be implemented as hardcoded functions of the controller 210. In an example, execution of the code 150 may cause the controller 120 to listen to the occurrence of a predefined trigger event as disclosed herein. If the trigger event is detected, code 150 may cause the controller 120 to destroy the memory 220 by directing an electric current through the memory 220 that exceeds a rated current of the memory 220, leading to physical damage of the memory 220 that prevents access to data stored by the memory 220. Execution of the code 150 may further cause the controller 210 to verify as disclosed herein whether the memory 220 has been destroyed successfully by testing operability of the memory 220. The code 150 may be configured to consider the destruction of the memory 220 successful if the operability of the memory 220 cannot be verified.

The current to be directed through the memory 220 may be generated in various ways. In an example, code 150 may cause the controller 210 to respond to the trigger event by switching electrical connections of the circuitry 202 such that the capacitor 206 discharges a current through electric terminals of the memory 220. In an example, the code 150, the controller 210 and the circuitry 202 may be configured to respond to the trigger event by switching between a charging phase where the capacitor 206 is charged by electrical power received through the connector 204, and a discharging phase where the capacitor 206 discharges a current through the memory 220. In an example, the code 150, the controller 210 and the circuitry 202 may be configured to respond to the trigger event by overcharging the capacitor 206 during a charging phase. In an example, the code 150, the controller 210 and the circuitry 202 may be configured to respond to the trigger event by switching electrical connections of the circuitry 202 such that the current directed through the memory 220 flows directly between electric terminals of the connector 204 and corresponding terminals of the memory 220. In an example, the code 150, the controller 210 and the circuitry 202 may be configured to respond to the trigger event by establishing electrical connections between terminals of the memory 220 having assigned a particular rated current and/or rated voltage and corresponding terminals of the connector 204 configured for providing a voltage and/or a current intensity exceeding the rated current and/or the rated voltage of the corresponding terminals of the memory 220. In an example, the code 150, the controller 210 and the circuitry 202 may be configured to respond to the trigger event by communicating to a processor of a computing device that is functionally coupled to the memory device 200 to cause the computing device to provide the current to the memory device using a power source of the computing device, which may include causing the computing device to supply a current and/or voltage to terminals of the connector 204 exceeding a predefined rated current and/or voltage specified for these terminals.

Figure 3:
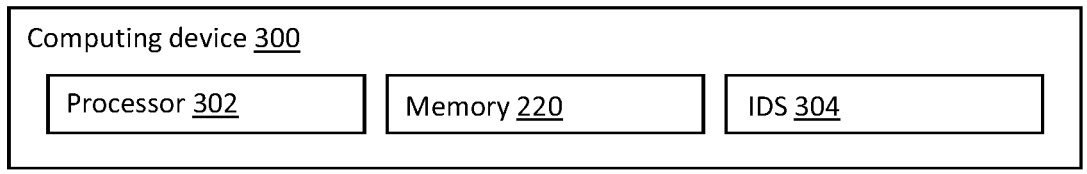
FIG. 3 is a block diagram depicting a computing device equipped with an intrusion detection system.

FIG. 3 is a schematic block diagram depicting a computing device 300 incorporating a processor 302, a memory comprising the memory 220, and an intrusion detection system (IDS) 304. The computing device 300 may be configured for carrying out the method of protecting data stored by a non-volatile solid-state memory from an unauthorized access disclosed herein using a processor of the computing device 300, which may include the processor 302 and/or a memory controller 210 onboard a memory device 200 incorporating the memory 220. In the example of FIG. 3, the IDS 304 is configured to initiate the trigger event (e.g., generating a signal or command indicating an increased probability of the unauthorized access) in case the IDS 304 detects a successful intrusion (or other successful attempt of mechanical manipulation) to the computing device 300. In response to the trigger event, execution of the method (code block 150) may cause a destruction of the memory 220 to protect data stored by the memory 220 from unauthorized access.

Figure 4:
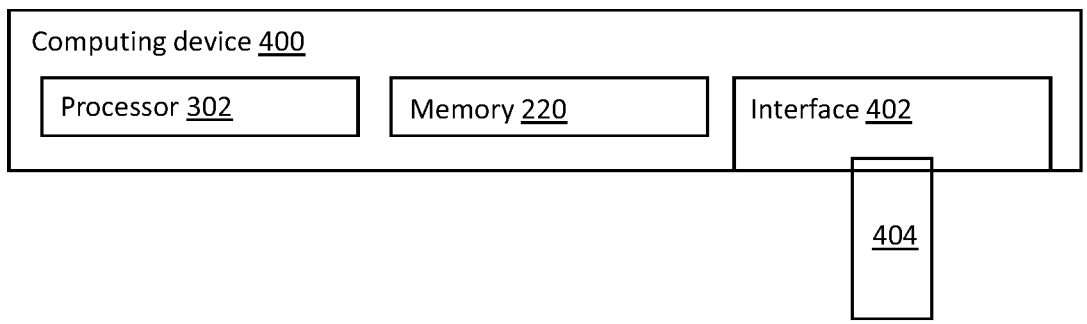
FIG. 4 is a block diagram depicting a computing device functionally coupled to a mobile trigger device.

FIG. 4 is a schematic block diagram depicting a computing device 400 incorporating a processor 302, a memory comprising the memory 220, and an interface allowing for establishing a functional coupling of a mobile trigger device 402 to the computing device 400. The computing device 400 may be configured for carrying out the method of protecting data stored by a non-volatile solid-state memory from an unauthorized access disclosed herein using a processor of the computing device 300, which may include the processor 302 and/or a memory controller 210 onboard a memory device 200 incorporating the memory 220. In the example of FIG. 4, the trigger device 404 is configured to initiate the trigger event (e.g., generating a signal or command indicating an increased probability of the unauthorized access) in case a user of the trigger device 404 performs a specific predefined action causing the trigger device 404 to initiate the trigger event (e.g., by activating a physical or virtual button provided by the trigger device 404). Code block 150 may be configured for causing the computing device 400, in response to detecting the trigger event, to destroy the memory 220 to protect data stored by the memory 220 from unauthorized access. The computing device 400 may be configured (e.g., programmed) to verify trustworthiness of the mobile trigger device 404 before starting the destruction of the memory 150 (e.g., by receiving authorized credentials and/or a digital certificate from the trigger device 404, performing a cryptographic key exchange with the trigger device 404, etc.).

Figure 5:
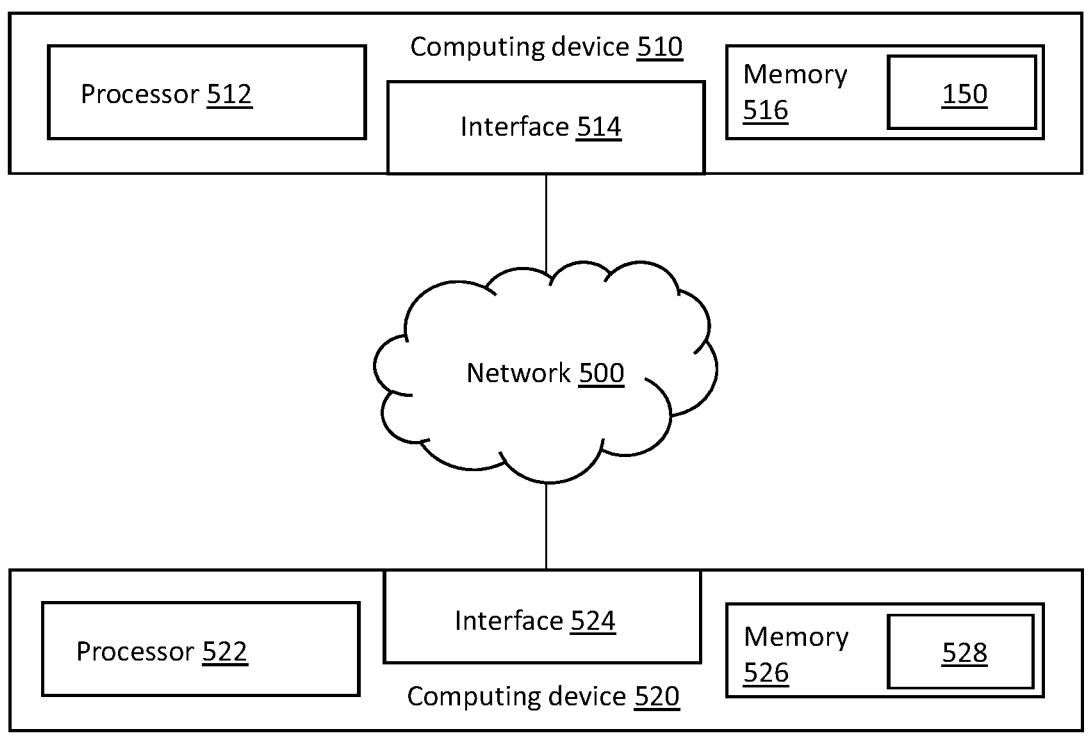
FIG. 5 is a block diagram depicting a network connecting a first computing device incorporating a non-volatile solid-state memory with a second computing device configured for initiating a trigger event causing destruction of the memory.

FIG. 5 is a schematic block diagram depicting a network 500 connecting a first computing device 510 incorporating a first memory 516 comprising a non-volatile solid-state memory 220 with a second computing device 520 configured for initiating a trigger event causing destruction of the memory 220. The computing device 510 may further comprise a first processor 512 and a first network interface 514 allowing for establishing a first communications link from the first computing device 510 to the network 500 and may be configured for carrying out the method of protecting data stored by a non-volatile solid-state memory from an unauthorized access disclosed herein using a processor of the computing device 300, which may include the processor 512 and/or a memory controller 210 onboard a memory device 200 incorporating the memory 220. In the example of FIG. 5, the computing device 520 comprises a second processor 522, a second memory 526, and a second network interface 524 allowing for establishing a second communications link from the second computing device 520 to the network 500.

Furthermore, the memory 526 may store software code 528 configured for initiating the trigger event on the first computing device 510 (e.g., generating a signal or command indicating an increased probability of the unauthorized access) in case a user of the software 528 performs a specific predefined action causing the second computing device 520 to communicate through the network 500 information for initiating the trigger event on the first computing device 510 (e.g., by a corresponding user input to the second computing device 520, such as activating a virtual button presented to the user by the software 528). Code block 150 may be configured for causing the first computing device 510, in response to receiving the information for initiating the trigger event from the network 500, to destroy the memory 220 to protect data stored by the memory 220 from unauthorized access. The first computing device 510 may be configured (e.g., programmed) to verify trustworthiness of the second computing device 520 before starting the destruction of the memory 220 (e.g., by receiving authorized credentials and/or a digital certificate from the second computing device 520, performing a cryptographic key exchange with the second computing device 520, etc.).

What is claimed is:

1. A computer-implemented method of protecting data stored by a non-volatile solid-state memory from an unauthorized access, the method comprising:
    in response to a trigger event indicating an increased probability of the unauthorized access, destroying the memory by directing through the memory an electric current exceeding a rated current of the memory; and
    in response to directing through the memory the electric current exceeding the rated current of the memory, testing an operability of the memory by directing a command to the memory intended to cause a response from the memory, wherein the destroying is completed when the testing indicates a lacking of an operability of the memory to cause the response.

2. The method of claim 1, the destroying comprising a plurality of repetitions of directing the electric current through the memory.

3. The method of claim 2, the current being successively increased during the repetitions.

4. The method of claim 3, wherein, for each of the repetitions, the current is selected from a predefined set of currents exceeding standard values of the rated current.

5. The method of claim 1, the current being generated by discharging a capacitor of a memory device incorporating the memory.

6. The method of claim 5, wherein:
    the generation of the current further comprises charging the capacitor at a voltage exceeding a rated charging voltage of the capacitor in order to force the capacitor to collect more charge carriers than could be collected by charging the capacitor at the rated charging voltage; and
    a higher current density is achieved inside the memory by discharging the capacitor, having been overcharged, through the memory.

7. The method of claim 1, the memory being a component of a memory device functionally coupled to a computing device electrically connected to a power source, the method further comprising establishing an electrical connection from the memory device to the power source for generating the current.

8. The method of claim 7, the electrical connection between the power source and the computing device being provided by a communications network, wherein the communications network includes a power-over-ethernet connection.

9. The method of claim 1, the trigger event being selected from the group consisting of a receipt of a signal indicating an attempt of unauthorized mechanical manipulation of a first computing device incorporating the memory, a receipt of an instruction requiring destruction of the memory, a power-up of the memory device outside a predefined geographic area, a mechanical detachment of the memory from the first computing device, and an establishment of a functional coupling of the memory to a second computing device different from the first computing device.

10. The method of claim 1, wherein the destroying is limited to the memory.

11. A circuitry comprising a memory controller, where the memory controller is configured to control a non-volatile solid-state memory, and protect data stored by the memory from an unauthorized access, the memory controller performing operations comprising:
    in response to a trigger event indicating an increased probability of the unauthorized access, destroying the memory by directing through the memory an electric current exceeding a rated current of the memory; and
    in response to directing through the memory the electric current exceeding the rated current of the memory, testing an operability of the memory by directing a command to the memory intended to cause a response from the memory, wherein the destroying is completed when the test indicates a lacking of an operability of the memory to cause the response.

12. The circuitry of claim 11, the destroying comprising a plurality of repetitions of directing the electric current through the memory.

13. The circuitry of claim 12, the current being successively increased during the repetitions.

14. The circuitry of claim 11, the current being generated by discharging a capacitor of a memory device incorporating the memory.

15. The circuitry of claim 11, wherein the trigger event comprises detecting an attempt of unauthorized mechanical manipulation of a computing device incorporating the memory.

16. A computer program product comprising a non-transitory computer readable storage medium having program instructions embodied therewith, the program instructions being executable by a processor functionally coupled to a non-volatile solid-state memory to cause the processor to perform a method of protecting data stored by the memory from an unauthorized access, the method comprising:
    in response to a trigger event indicating an increased probability of the unauthorized access, destroying the memory by directing through the memory an electric current exceeding a rated current of the memory; and
    in response to directing through the memory the electric current exceeding the rated current of the memory, testing an operability of the memory by directing a command to the memory intended to cause a response from the memory, wherein the destroying is completed when the test indicates a lacking of an operability of the memory to cause the response;
    wherein the current is generated by discharging a capacitor of a memory device incorporating the memory;
    wherein the generation of the current further comprises charging the capacitor at a voltage exceeding a rated charging voltage of the capacitor in order to force the capacitor to collect more charge carriers than could be collected by charging the capacitor at the rated charging voltage; and wherein a higher current density is achieved inside the memory by discharging the capacitor, having been overcharged, through the memory.

17. The computer program product of claim 16, the destroying comprising a plurality of repetitions of directing the electric current through the memory.

18. The computer program product of claim 17, the current being successively increased during the repetitions.

19. The computer program product of claim 16, the trigger event being selected from the group consisting of a receipt of a signal indicating an attempt of unauthorized mechanical manipulation of a first computing device incorporating the memory, a receipt of an instruction requiring destruction of the memory, a power-up of the memory device outside a predefined geographic area, a mechanical detachment of the memory from the first computing device, and an establishment of a functional coupling of the memory to a second computing device different from the first computing device.

* * * * *